United States Patent [19]

Chung

[11] 4,247,678

[45] Jan. 27, 1981

[54] POLYURETHANE DERIVED FROM BOTH AN ALIPHATIC DICARBOXYLIC ACID AND AN AROMATIC DICARBOXYLIC ACID AND FUEL CONTAINER MADE THEREFROM

[75] Inventor: Daniel A. Chung, North Canton, Ohio

[73] Assignee: The Goodyear Tire & Rubber Company, Akron, Ohio

[21] Appl. No.: 67,265

[22] Filed: Aug. 17, 1979

[51] Int. Cl.$^3$ .............................................. C08G 18/42
[52] U.S. Cl. ..................................................... 528/83
[58] Field of Search ...................... 528/83; 429/34, 35, 429/36, 163, 208, 247, 248, 249, 253, 254

[56] References Cited

U.S. PATENT DOCUMENTS

| | | | |
|---|---|---|---|
| 2,880,192 | 3/1959 | Coffey et al. | 528/83 |
| 3,738,860 | 6/1973 | Von Roda et al. | 429/163 |
| 3,804,810 | 4/1974 | Fryd | 528/83 |
| 3,929,732 | 12/1975 | Shah | 528/83 |
| 3,951,919 | 4/1976 | Pinfold et al. | 528/83 |
| 3,998,871 | 12/1976 | Carlson | 429/249 |
| 4,102,868 | 6/1978 | Genetti et al. | 528/83 |
| 4,158,649 | 6/1979 | Angres et al. | 429/248 |

*Primary Examiner*—Maurice J. Welsh
*Attorney, Agent, or Firm*—J. D. Wolfe

[57] ABSTRACT

A polyester urethane fuel cell having at least one layer of a reaction product of an organic polyisocyanate and a mixed polyester and a curative. In the preferred embodiment the fuel cell has a barrier layer composed of a polyester urethane formed from reacting bis(4-cyclohexyl isocyanate) with 10 to 90 mol percent of polyhexamethylene ortho phthalate and 90 to 10 mol percent of a polycaprolactane and curative. The mixed polyesters are either a blend or co-condensation product of a monomeric polyol of less than 5 carbon atoms with an aromatic dicarboxylic acid and an aliphatic dicarboxylic acid.

9 Claims, No Drawings

POLYURETHANE DERIVED FROM BOTH AN ALIPHATIC DICARBOXYLIC ACID AND AN AROMATIC DICARBOXYLIC ACID AND FUEL CONTAINER MADE THEREFROM

TECHNICAL FIELD

This invention relates to a polyester urethane covered fabric container for fuel and to the method of making said container. More particularly this invention relates to a novel polyester urethane.

PRIOR ART

Polyurethane fuel cells or container have been made and used almost exclusively on light aircraft. As aircraft has become more advanced and sophisticated so have the demands for better performance of the fuel cells. These demands are particularly noteworthy as polyether urethanes have low strength relative to the polyester urethanes. In turn the polyester urethanes have a tendency to hydrolyze in the presence of moisture. To illustrate this problem polyurethane covered fabrics with a suitable barrier layer have been used in aircraft fuel cells for a number of years. Unfortunately the polyurethane made from a prepolymer of polytetramethylene adipate and organic polyisocyanate, available under the trademark designation Hylene WS TM and cured with 4,4'-methylene dianiline showed a large loss of its tensile strength after seven days in a steam chamber.

DISCLOSURE OF THE INVENTION

A new polyurethane was developed that possesses these improvements without sacrificing other properties necessary as fuel cell building material. These properties include (1) fuel resistance because the urethane is in contact with fuel; (2) low temperature flexibility because of extreme weather conditions and high altitudes reached by aircraft; and (3) resistance to swelling in anti-icing fluids, like ethylene glycol monomethyl ether (methyl cellusolve) or diethylene glycol monobutyl ether (butyl carbitol), which are added to fuel to prevent the moisture in it from freezing.

I have discovered that a special polyester urethane can be made by using either an aliphatic or an alicyclic polyisocyanate to react with either a blend of a polyester A and a polyester B or a copolymer of these and curing them with a diamine curative.

DESCRIPTION OF THE INVENTION

Sprayable polyurethane can be formulated from these polyurethanes which have excellent hydrolysis resistance and are suitable for the manufacture of fuel storage cells or tanks. The new urethanes also show excellent low temperature flexibility and resistance to fuel and anti-icing fluids. To achieve all of these properties preferably a urethane prepolymer is made by reacting an aliphatic diisocyanate methylene bis (4-cyclohexylisocyanate) (Hylene WS TM ) and a polyester derived from the reaction of a glycol with a mixture of an aromatic and an aliphatic dicarboxylic acid. The prepolymer is then cured with a diamine curative to form a film.

The excellent hydrolysis resistance of the urethane film of this invention is shown by the tensile strength retention after 120 days of exposure to a 100 percent relative humidity environment at 70° C. or after 12 to 14 days in a steam chamber at 100° C. A tensile retention of at least 50 percent in either test is considered superior to the prior art urethanes. Two tests are performed to show the fuel resistance of the film. The film is soaked for 72 hours at 57° C. in a hydrocarbon solution of isooctane/toluene at 70/30 by volume designated herein as Larmol. A tensile retention of at least 40 percent after the test is required. The second test measures the volume change or swelling of the film after three days of soaking in the same hydrocarbon fluid (modified ASTM 2-471-59T). A volume change value of 22 percent or less is considered satisfactory.

Another sample was soaked in a 75/25 mixture of water and ethylene glycol monomethyl ether or diethylene glycol monobutyl ether. The film is considered to have excellent anti-icing fluid resistance if it retains 60 percent or more of its original tensile after 72 hours of soaking in the fluid.

The low temperature flexibility of the film was shown by a modified Masland Bend Test. The test is run by dropping a weight of 3.09 kilograms from a height of 27.94 centimeters on a 1.27 × 3.62 centimeter strip in the form of a loop. The test was repeated at various temperatures. The film passed the test at or below −94° C. without breaking into two pieces after the weight drop.

BEST MODE FOR CARRYING OUT THE INVENTION

The following representative examples illustrate the invention wherein parts and percentages are by weight unless otherwise designated.

EXAMPLE 1

A 2000 molecular weight polyester made by condensation of 1,6-hexane diol with a 1:1 mol ratio of a mixture of isophthalic and azelaic acids was degassed and used to make a prepolymer. This polyester was reacted with methylene bis(4-cyclohexylisocyanate) according to the formulations in Table I to give the urethane prepolymers. The prepolymers were dissolved in the specified solvent or mixture of solvents to form a diluted prepolymer. The dilute prepolymers were then mixed with diamine curative solutions and additives as shown in the formulations in Tables II and III. The resultant solutions were used to spray on polyethylene slabs to give tack-free films in about five minutes to about an hour. Most of the solvents in the film evaporated after standing overnight (∼ 18 hours) at ambient temperatures. The films were postcured in a 65° to 71° C. oven for 18 hours before they were tested. Table II gives the physical properties of the films. These films passed the Masland Bend Test at −95° C. and had volume change in Larmol solvent test of 18 to 22 percent.

EXAMPLE 2

Polyhexamethylene 50/50 isophthalate/azelate polyol of 1000 molecular weight was reacted with Hylene WS TM at an isocyanate to hydroxyl ratio of 1.65 to form a prepolymer. The prepolymer was diluted to 64 percent solids using toluene (see Table IV). This dilute prepolymer was blended with dilute prepolymer A in Table I and films were prepared by spraying according to the formulations in Table V. The excellent physical properties are listed in the same table.

EXAMPLE 3

A variation of the prepolymers in Example 1 can be made by the introduction of some trifunctionality into the polymer backbone. Trimethylolpropane is used at 1.0 pbw per 100 pbw polyhexamethylene 50/50 isophthalate/azelate polyol. The mixture of polymeric polyol and monomeric triol was reacted with Hylene WS ™ to make a prepolymer (see Table VI). The prepolymer is diluted to 50 percent solids using a 50:50 mixture of toluene and methylethyl ketone and is mixed with different curative solutions to prepare films by spraying. The formulations and the excellent resistance of the films to steam aging at 100° C. is shown in Table VII. Other physical properties are also included in the table.

EXAMPLE 4

Instead of diluting the prepolymer of Example 1 the prepolymer was used as a hot melt to prepare a casting without the use of any organic solvent. The prepolymer was heated and degassed at the same time. When the temperature reached 100° C. the vacuum was broken and the molten curative and additive were added according to Table IX. The mixture was thoroughly stirred and then poured into molds to make test samples like 0.122 to 0.152 centimeter thick tensile sheet and a 1.77 centimeter thick block or a molded part like a nipple fitting for an aircraft fuel cell. Castings were made from prepolymers using 1,4-cyclohexane bis(methylisocyanate) (CBMI) and methylene bis(4-cyclohexylisocyanate) containing about 70 percent of the trans, trans isomer (70 percent trans, trans $H_{12}MDI$). These formulations and the physical properties are listed in Tables VIII and IX.

EXAMPLE 5

An aircraft fuel cell or tank was made by spray coating a waxed cardboard form with the polyurethane reaction mixture of Example 1 to give a film 0.5 to 3 mils thick. Then this film was spray coated with a barrier material to build up a barrier coating of about 1 to 5 mils, and preferably 1.5 to 3 mils.

Then over the barrier coat additional spray coats of the polyurethane reaction mixture of Example 1 were applied to give a finished fuel cell having the necessary filling and emptying openings. Optionally various fabric or reinforcing materials are included between spray coats in accordance with the customary fuel cell construction techniques.

The barrier material used to spray build the barrier layer was a reaction mixture composed of 100 parts of prepolymer formed by reacting 95.4 parts of Hylene WS ™ with 100 parts of a mixture of 50/50 polyhexamethylene orthophthalate of 570 molecular weight and polycaprolactone of 520 molecular weight and 8.71 parts of meta-phenylene diamine in sufficient solvent, such as methylethyl ketone or toluene, to give a 50 to 65 percent solid dispersions.

The cured fuel cell was removed from the cardboard form in normal manner. This cell passed tests required to be accepted as a commercial fuel cell. It is indeed amazing to see the cell pass the fuel diffusion and hydrolysis test when the barrier per se and the coating materials per se do not pass this diffusion too. Also, the cell has excellent hydrolysis resistance. Thus it is evident this combination of materials has a synergist effect.

Although the specification has described the polyesters as a mixture of two or more polyesters or as co-esterified ones it is desirable in the claims for simplicity to refer to these two types of polyesters as mixed polyester without regard to whether they are co-condensation products or physical mixtures of two or more condensation products. Also, this term "mixed polyester" heretofore has related to material having structure obtained by condensation of a monomeric polyol of less 400 molecular weight with a dicarboxylic acid or anhydride, preferably of 6 to 9 carbon atoms. It should be appreciated that a small amount of trifunctionality, preferably about 1 to 10 mol percent, can be useful and desirable. Generally the mixed polyesters useful in this invention have molecular weights of about 500 to 4000 with the preferred range being about 1000 to 3000 molecular weight.

Generally the mixed polyesters are reacted with excess organic polyisocyanate with about 3 to 10 mol percent excess being perferred in forming the reaction product.

Normally the reaction product is cured with a curative in amounts of about 85 to 100 percent of the excess isocyanate. Useful curatives are the monomeric polyols of 2 to 3 hydroxyls of less 400 molecular weight and the amine of the diamine type selected from aliphatic, cycloaliphatic aromatic classes. Representative examples of the monomeric polyols are ethylene glycol, butane glycol, diethanol carbamate and diethylene glycol.

TABLE I

| Prepolymer Formulation | A | B | C | D | E |
|---|---|---|---|---|---|
| Polyhexamethylene Isophthalate/Azelate @ 1/1, MW 1800 | 100 | | | | |
| Polyhexamethylene Isophthalate/Azelate @ 1/1, MW 2100 | | 100 | 100 | 100 | 100 |
| Hylene WS ™ | 29.1 | 22.45 | 23.70 | 26.20 | 27.44 |
| Equivalent NCO/ Equivalent OH | 2.00 | 1.80 | 1.90 | 2.10 | 2.20 |
| % NCO of 64% Prepolymer in toluene | 2.35 | | | | |
| % NCO of 50% Prepolymer in toluene/MEK @ 1/1 | | 1.27 | 1.42 | 1.73 | 1.89 |

TABLE II

| Cure Formulation | 1 (Parts) |
|---|---|
| Dilute Prepolymer A in toluene, 64% solids | 110.00 |
| Methyl ethyl ketone (MEK) | 30.00 |
| Masterbatch a* | 20.00 |
| Stabaxol P ™, a polycarbodiimide | 0.70 |
| 30% meta-phenylenediamine (MPD) in MEK | 9.85 |
| *Masterbatch a composition of leveling agent | 2.50 |
| Epon 1001 ™ in MEK | 10.00 |
| Methyl ethyl ketone | 87.50 |

| Physical Properties | Original | After 90 days in 100% RH Chamber @ 70° C. | After 128 Days |
|---|---|---|---|
| 100% Modulus, Kg/cm² | 56 | 47 | 51 |
| 300% Modulus, Kg/cm² | 130 | 130 | 150 |
| Ultimate Tensile, Kg/cm² | 220 | 260 | 260 |
| Ultimate Elongation % | 400 | 410 | 390 |

| Days in Steam Chamber @ 100° C. | Original | After 90 days in 100% RH Chamber | After 128 Days |
|---|---|---|---|
| 100% Modulus, Kg/cm² | 55 | 55 | 53 |
| 300% Modulus, Kg/cm² | 176 | 176 | 140 |
| Ult Tensile, Kg/cm² | 240 | 240 | 176 |
| Ult Elong. % | | 360 | 360 |
| Tensile Retention after 72 hours in Larmol @ 57° C. % | | | 44 |
| Tensile Retention after 72 hours in Aqueous Antiicing Fluid @ 57° C. % | | | 77 |

TABLE III

| Cure Formulation | 2 | 3 | 4 | 5 |
|---|---|---|---|---|

TABLE III-continued

| | | | | |
|---|---|---|---|---|
| Dil Prepolymer, B, g | 150 | | | |
| Dil Prepolymer C, g | | 150 | | |
| Dil Prepolymer D, g | | | 150 | |
| Dil Prepolymer E, g | | | | 150 |
| Masterbatch b*, g | 30 | 30 | 30 | 30 |
| 30% MPD/MEK, g | 7.27 | 8.13 | 9.90 | 10.8 |
| Hydrolysis Resistance Test Results | | | | |
| Original: 100% Modulus, $Kg/cm^2$ | 24 | 32 | 48 | 51 |
| 300% Modulus, $Kg/cm^2$ | 10 | 91 | 150 | 170 |
| Ult Tensile, $Kg/cm^2$ | 260 | 240 | 260 | 300 |
| Ult Elong, % | 410 | 420 | 380 | 360 |
| After 120 days over $H_2O$ | | | | |
| 70° C.  100% Modulus, $Kg/cm^2$ | | | 31 | 39 |
| 300% Modulus, $Kg/cm^2$ | | | 84 | 100 |
| 70° C.  Ult Tensile, $Kg/cm^2$ | | | 160 | 170 |
| Ult Elong, % | | | 440 | 380 |
| Tensile Retention after 72 hrs in Larmol @ 57° C. % | 46 | 51 | 48 | 51 |
| Tensile Retention after 72 hrs in Aqueous Antiicing Fluid @ 57° C. % | 62 | 76 | 60 | 64 |
| "Masland" Bend Test | −95 | | −95 | −95 |
| Volume Change in Larmol, % | 22 | 21 | 21 | 20 |

*Masterbatch b Composition:
- Modaflow: 1.25 pbw
- 80% Epon 1001/MEK: 6.25 pbw
- MEK: 92.50 pbw

TABLE IV

| Prepolymer Formulation | F |
|---|---|
| Polyhexamethylene Isophthalate/Azelate @ 1/1, MW 1000 | 100.0 pbw |
| Hylene WS ™ | 43.2 pbw |
| Equiv NCO/Equiv OH | 1.62 |
| % NCO of 64% prepolymer in Toluene | 2.31 |

TABLE V

| Cure Formulation | 6 | 7 | 8 | 9 | 10 |
|---|---|---|---|---|---|
| Dilute Prepolymer A, g | 80.0 | 80.0 | 80.0 | 80.0 | 80.0 |
| Dilute Prepolymer F, g | 80.0 | 80.0 | 80.0 | 80.0 | 80.0 |
| 30% MPD/MEK, g | 14.2 | 14.2 | 14.2 | 14.2 | 14.2 |
| 80% Epon 1001/MEK, g | 5.0 | 7.0 | — | — | — |
| Masterbatch C* | — | — | 8.0 | 12.0 | 16.0 |
| Hydrolysis Resistance Test Results | | | | | |
| Original | | | | | |
| 100% Modulus, $Kg/cm^2$ | 57 | 65 | 62 | 60 | 58 |
| 300% Modulus, $Kg/cm^2$ | 176 | 220 | 180 | 200 | 176 |
| Ult Tensile, $Kg/cm^2$ | 270 | 320 | 270 | 290 | 240 |
| Ult Elong, % | 380 | 360 | 370 | 370 | 350 |
| After 128 days over $H_2O$ @ 70° C. | | | | | |
| 100% Modulus, $Kg/cm^2$ | 43 | 46 | 48 | 47 | 49 |
| 300% Modulus, $Kg/cm^2$ | 110 | 130 | 140 | 150 | 170 |
| Ult Tensile, $Kg/cm^2$ | 200 | 240 | 220 | 200 | 260 |
| Ult Elong, % | 400 | 400 | 380 | 360 | 368 |
| Tensile Retention after 72 hours in Larmol @ 57° C., % | | 54 | | | |
| Tensile Retention after 72 hours in Aqueous Antiicing Fluid @ 57° C., % | | 92 | | | |
| "Masland" Bend Test | | −95 | | | −95 |
| Volume Change in Larmol, % | | 17 | 17 | 16 | 16 |

*Masterbatch c Composition:
- Santowhite: 1.00 pbw
- 80% Epon 1001/MEK: 6.00 pbw
- p-Methoxyphenol: 1.00 pbw
- MEK: 3.43 pbw

TABLE VI

| Prepolymer Formulation | G |
|---|---|
| Polyhexamethylene Isophthalate/Azelate @ 1/1, MW 2150 | 100.0 pbw |
| Trimethylolpropane | 1.0 pbw |
| Hylene WS ™ | 30.23 pbw |
| Equiv NCO/Equiv Total OH | 2.00 |
| % NCO of 50% Prepolymer in MEK/Toluene | 1.87 |

TABLE VII

| Cure Formulation | 11 | 12 | 13 | 14 | 15 | 16 |
|---|---|---|---|---|---|---|
| 50% Prepolymer G in 1:1 MEK: Toluene, g | 150.0 | 150.0 | 150.0 | 150.0 | 150.0 | 150.0 |
| Masterbatch b (see table III), g | 30.0 | 30.0 | 30.0 | 30.0 | 30.0 | 30.0 |
| 20% 1,3-bis(aminomethyl)cyclohexane/MEK g | 21.3 | | | | | |
| 20% Isophoronediamine in 3:1 MIBK:MEK, g | | 25.5 | | | | |
| 30% meta-Phenylenediamine/MEK, g | | | 10.7 | | 10.7 | 10.7 |
| 20% bis(4-aminocyclohexyl) methane/MEK, g | | | | 31.5 | | |
| 10% Stabaxol P/Toluene, g | | | | | 7.5 | |
| 10% Staboxol M/MEK, g | | | | | | 7.5 |
| Hydrolysis Resistance Test Results: | | | | | | |
| Original: | | | | | | |
| 100% Modulus, $Kg/cm^2$ | 52 | 62 | 58 | 45 | 60 | 58 |
| 300% Modulus, $Kg/cm^2$ | 170 | 220 | 190 | 150 | 220 | 190 |
| Ult Tensile, $Kg/cm^2$ | 250 | 280 | 250 | 176 | 225 | 240 |
| Ult Elong, % | 360 | 330 | 340 | 330 | 305 | 330 |
| After 13 days in a steam chamber @ 100° C. | | | | | | |
| 100% Modulus, $Kg/cm^2$ | 51 | 65 | 48 | 84 | 47 | 56 |
| 300% Modulus, $Kg/cm^2$ | 170 | 220 | 130 | 260 | 130 | 190 |
| Ult Tensile, $Kg/cm^2$ | 220 | 240 | 134 | 260 | 140 | 210 |
| Ult Elong, % | 330 | 310 | 310 | 300 | 310 | 310 |
| "Masland" Bend Test, °F. | −70 | −70 | −70 | −100 | −100 | −70 |

TABLE VIII

| Prepolymer Formulation | H | I |
|---|---|---|
| Polyhexamethylene Isophthalate/ Azelate @ 1/1, MW 2140 | 100.0 pbw | 100.0 pbw |
| ~70% trans, trans-H₁₂MDI | — | 24.5 pbw |
| CBMI | 18.2 pbw | — |
| Equiv NCO/Equiv OH | 2.00 | 2.00 |
| % NCO of Prepolymer | 3.33 | 3.00 |

TABLE IX

| Cure Formulation | 17 | 18 | 19 | 20 | 21 |
|---|---|---|---|---|---|
| Prepolymer A, 100% solids, pbw | 100 | 100 | | | |
| Prepolymer H, 100% solids, pbw | | | 100 | | |
| Prepolymer I, 100% solids, pbw | | | | 100 | 100 |
| Epon 828, pbw | 4.0 | 4.0 | 4.0 | 4.0 | 4.0 |
| 50/50 Caytur 7/ polyhexamethylene Isophthalate/Azelate (MW 2140) pbw | 12.0 | | | | 10.0 |
| 50/50 MPD/Polyhexa-methylene/Isophthalate/ Azelate (MW 2140) pbw | | 8.61 | 7.96 | 7.17 | — |
| Amine Level | 0.93 | 0.93 | 0.93 | 0.93 | 0.93 |
| Original: | | | | | |
| 100% Modulus, Kg/cm² | 49 | 48 | 19 | 42 | 35 |
| 300% Modulus, Kg/cm² | 156 | 170 | 46 | 77 | 91 |
| Ult Tensile, Kg/cm² | 370 | 380 | 310 | 340 | 260 |
| Ult Elong, % | 400 | 390 | 510 | 510 | 440 |
| Crescent Tear, Kg /cm | 57.2 | 51.8 | 35.7 | 58.9 | 46.4 |
| Shore A Hardness | 82 | 77 | 60 | 84 | 65 |

While certain representative embodiments and details have been shown for the purpose of illustrating the invention it will be apparent to those skilled in this art that various changes and modifications may be made therein without departing from the spirit or scope of the invention.

I claim:

1. A polyurethane comprising the reaction product of an aliphatic or alicyclic polyisocyanate with a mixed polyester selected from the class consisting of (1) a copolyester having the structure obtained by condensation of a polyol of less than 900 molecular weight with an aliphatic dicarboxylic acid and an aromatic dicarboxylic acid and (2) a blend of an aliphatic polyester and an aromatic polyester and cured with a curative containing at least two groups selected from the class of amine and hydroxyl.

2. The polyurethane of claim 1 where the polyol condensed with the dicarboxylic acid contains at least 6 carbon atoms.

3. The polyurethane of claim 2 wherein the aliphatic dicarboxylic acid contains from 6 to 9 carbon atoms.

4. The polyurethane of claim 2 wherein the dicarboxylic acids are composed of a mixture of isophthalic and azelaic.

5. The polyurethane of claim 1 wherein the polyester contains 1 to 10 mol percent of trifunctionality.

6. A polyester urethane fuel cell having at least one layer of an elastomer composed of reaction product of an aliphatic or an alicyclic polyisocyanate with mixed polyesters having structures obtained by condensation of a monomeric polyol of less 400 molecular weight with a blend of 10 to 90 mol percent of an aromatic dicarboxylic acid and 90 to 10 mol percent of an aliphatic dicarboxylic acid of 6 to 9 carbon atoms to give at least 3 mol percent free NCO and then curing with a curative containing hydroxyl or amino groups.

7. The fuel cell of claim 6 having a fuel barrier layer composed of a polyester urethane obtained by reacting methylene bis(4-cyclohexylisocyanate) with 10 to 90 mol percent of polyhexamethylene ortho phthalate and 90 to 10 mol percent of polycaprolactone to form a prepolymer and curing the prepolymer with a diamine.

8. The fuel cell of claim 6 wherein the diamine is meta-phenylene diamine.

9. The fuel cell of claim 6 wherein the elastomer contains a fabric reinforcing material.

* * * * *